United States Patent
Roesgen

(10) Patent No.: US 7,192,518 B2
(45) Date of Patent: Mar. 20, 2007

(54) LIQUID CIRCUIT

(75) Inventor: Andre Roesgen, Remshalden (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/328,173

(22) Filed: Dec. 26, 2002

(65) Prior Publication Data

US 2003/0150783 A1   Aug. 14, 2003

Related U.S. Application Data

(63) Continuation of application No. PCT/EP01/06548, filed on Jun. 9, 2001.

(30) Foreign Application Priority Data

Jun. 27, 2000  (DE) .............................. 100 30 324

(51) Int. Cl.
*B01D 35/14* (2006.01)
*F02M 37/22* (2006.01)

(52) U.S. Cl. ............... 210/149; 210/195.1; 210/257.1; 210/171

(58) Field of Classification Search ................. 210/85, 210/149, 195.1, 257.1, 184, 136, 171, 97, 210/194
See application file for complete search history.

(56) References Cited

U.S. PATENT DOCUMENTS

| | | | |
|---|---|---|---|
| 4,502,451 A * | 3/1985 | Duprez | 123/516 |
| 5,263,456 A * | 11/1993 | Owen-Evans | 123/495 |
| 5,887,573 A * | 3/1999 | Janik et al. | 123/514 |
| 5,958,225 A * | 9/1999 | Bradford | 210/149 |
| 6,189,513 B1 * | 2/2001 | Brown et al. | 123/497 |
| 6,361,684 B1 * | 3/2002 | Hawkins et al. | 210/91 |

FOREIGN PATENT DOCUMENTS

| | | |
|---|---|---|
| DE | 19714488 | 9/1998 |
| DE | 19926172 | 12/2000 |
| EP | 0833050 | 4/1998 |
| EP | 0984157 | 3/2000 |
| EP | 1058000 | 12/2000 |
| EP | 0887542 | 8/2001 |
| EP | 0819458 | 11/2002 |

OTHER PUBLICATIONS

International Search Report Oct. 23, 2001.

* cited by examiner

*Primary Examiner*—Terry K. Cecil
(74) *Attorney, Agent, or Firm*—Crowell & Moring LLP

(57) ABSTRACT

A circuit for filtering a liquid, comprising a storage vessel (10), a pump (17), a consumer device (14), a filter element (23) and a controller (24). The circuit maybe used in systems where liquid, e.g. water, oil or fuel, is filtered and at least part thereof is returned to the storage vessel. Liquid is pumped in the circuit from the storage vessel by the pump through lines (11, 13, 15, 16), filtered by filter (23) and supplied to the consumer device. Excess liquid not required by the consumer device (14) is returned via return line (15) to the controller (24) which directs the liquid either to the filter or the storage vessel—depending on liquid temperature. The controller (24) and the filter are arranged in a common housing (18) having connectors for an unfiltered liquid inlet (19), a filtered liquid outlet (20), a liquid return (21) and a liquid outlet (22). The connectors (19–22) enable rapid assembly of the circuit.

17 Claims, 4 Drawing Sheets the present invention by providing a liquid circuit comprising a liquid storage vessel, a liquid pump, a consumer device, a filter element having an unfiltered liquid side and a filtered liquid side, and a controller with a temperature detection unit for determining the temperature of a liquid in the liquid circuit; the controller comprising a valve, responsive to the temperature of the liquid, for returning excess liquid not needed by the consumer or user device at least partially to the filter element; wherein the filter element and the controller are integrated into a common liquid filter system comprising a housing having an unfiltered liquid inlet communicating with the unfiltered liquid side of the filter element, a filtered liquid outlet communicating with the filtered liquid side of the filter element, a liquid return which communicates with the controller, and a liquid outlet which communicates with the controller; the liquid storage vessel being connected to the unfiltered liquid inlet by an unfiltered liquid line; the filtered liquid outlet being connected to the consumer device by a filtered liquid line; the consumer device being connected to the liquid return by a liquid return line, and the liquid outlet being connected to the storage vessel by a liquid drain line; wherein the controller is connected by a connection line to the unfiltered side of the filter element, and the temperature detection unit is arranged between the liquid storage vessel and the consumer device.

LIQUID CIRCUIT

CROSS REFERENCE TO RELATED APPLICATIONS

This application is a continuation of international patent application no. PCT/EP01/06548, filed Jun. 9, 2001, designating the United States of America and published in German as WO 02/01061, the entire disclosure of which is incorporated herein by reference. Priority is claimed based on Federal Republic of Germany patent application no. DE 100 30 324.2, filed Jun. 27, 2000.

BACKGROUND OF THE INVENTION

The present invention relates to a liquid circuit comprising a liquid storage vessel, a liquid pump, a device which consumes or utilizes the liquid, a filter element having an unfiltered liquid side and a filtered liquid side, and a controller for returning excess liquid not needed by the consumer device at least partially to the filter element.

German Patent No. DE 197 14 488 discloses a method and a fuel injection system for heating a fuel. In the method of heating fuel, the fuel is compressed by a fuel pump to an injection pressure necessary for injection. A part of the compressed fuel is supplied via a fuel filter to an internal combustion engine, where it is injected by fuel injectors. The fuel which is not injected is depressurized via a valve or a leakage line and at least partially supplied to the fuel pump again. The valve opens as soon as the fuel has a fuel temperature below a minimum temperature.

To carry out this method, the fuel injection system has a fuel supply line which is connected to the fuel tank, and a fuel pump is provided for delivering the fuel from the tank into the fuel line, in which a fuel filter for filtering the fuel is positioned. The fuel line is connected to a fuel injector of an internal combustion engine. A valve, which is connected via a return line to the fuel supply line, is provided on the fuel line. The valve opens as a function of predetermined operating states. For this purpose, the valve is constructed as a thermostat valve, which automatically connects the fuel return line to the fuel supply line when the fuel temperature is below a minimum temperature. The return line is connected to the fuel supply line in such a way that the heated fuel mixes with the cold fuel from the tank, whereby the mixing may occur in a mixing chamber.

However, the fuel injection system includes a large number of lines, connected by valves and thermostats to a central processing unit. In addition, numerous fuel lines must be connected to the components. In this case, during the installation of the fuel injection system on an internal combustion engine, there is a significant outlay for installation and there is also a significant danger that different lines may be confused with one another.

SUMMARY OF THE INVENTION

It is an object of the invention to provide an improved liquid circuit for a liquid filtering system.

Another object of the invention is to provide a liquid circuit which supplies a heated liquid at least partially to a filter element.

A further object of the invention is to provide a liquid circuit which is easy to understand and simple to install.

It is also an object of the invention to provide a liquid circuit which is particularly adapted for filtering water from diesel fuel supplied to the fuel injectors of a diesel, internal combustion engine.

These and other objects are achieved in accordance with

For this purpose, the liquid circuit according to the present invention comprises a liquid storage vessel, a liquid pump, a filter element, a device which consumes or uses the liquid, and a controller, the filter element and the controller being integrated into a liquid filter system formed by a housing. If desired, multiple parts, such as a filter unit having a filter element and a controller, may be assembled into a module in the housing and thus form the liquid filter system. The liquid storage vessel is connected via an unfiltered liquid line to an unfiltered liquid inlet fixed on the housing. The liquid line pump is positioned in the liquid circuit in such a way that the liquid may circulate in the liquid circuit. The filter element has an unfiltered liquid side and a filtered liquid side, the unfiltered liquid inlet communicating with the unfiltered side of the filter element. The filtered side of the filter element communicates with a filtered liquid outlet, which is also fixed on the housing. A filtered liquid line, which conducts a liquid, for example, water, emulsions, oil, or fuel, to the user device, is attached to the filtered liquid outlet.

The liquid consuming device accepts, at most, only a part of the liquid pumped through the circuit. The remaining liquid, or all of the pumped liquid if the user device is not accepting any liquid, is supplied to the controller via a liquid return line which is connected to a liquid return fixed on the housing. The liquid may be heated by the user device or by other surrounding components, which are optionally part of the liquid circuit. As a result of this heating effect, the liquid temperature of the returned liquid may be significantly above the liquid temperature in the liquid storage vessel.

The controller comprises a temperature detection unit for determining a liquid temperature existing in the liquid, and a valve, which is controllable in accordance with the liquid temperature. The liquid temperature may be detected before or after the filter element. As soon as the liquid temperature is above a defined temperature, the controller conducts the liquid back into the liquid storage vessel via a liquid drain line which is connected to a liquid outlet fixed on the housing. If the liquid temperature is below the defined temperature, the liquid not accepted by the user device is returned from the controller to the filter element via a connection line. In this way, the unfiltered liquid is mixed with the returned liquid, which has a higher liquid temperature, through which the viscosity of the liquid to be filtered is reduced. Consequently, the resistance to flow produced by the filter element may be decreased.

If only a part of the liquid which is not accepted by the user device is to be supplied to the filter element, a return line valve is provided on the connection line, through which a part of the liquid may be supplied to the filter element and a further part of the liquid may be supplied to the liquid storage vessel.

The liquid consumer or user device may be, for example, a fuel injection system of an internal combustion engine, which only consumes a part of the liquid, for example, diesel fuel, and supplies the unused fuel to the controller via a liquid return line. In this case, the excess pumped fuel is supplied via the liquid return line to the controller, which supplies the fuel to the filter element and/or to the liquid storage vessel depending on the fuel temperature. If the liquid temperature, which is to be detected after the filter element, is below a defined temperature, for example, 20° C., the returned fuel is supplied via the connection line to the filter element, whereby the cold fuel from the liquid storage vessel mixes with the heated fuel from the connection line. In this way, paraffins, which are contained in the fuel and clog the filter element at low fuel temperatures, may be dissolved.

Another possible liquid consuming device be, for example, the transmission of an internal combustion engine, which is connected to an oil circuit. The oil circuit is a closed system, in which the oil is used to reduce the material wear. The colder the oil is, the more viscous it is. This is particularly disadvantageous during cold starting of an engine, since in this case the lubricant film may be interrupted and therefore significant wear may occur. By mixing the cold oil from the liquid tank with the heated returned oil, the viscosity of the oil may be reduced and the lubrication in the cold state may be improved.

One advantageous embodiment of the present invention includes a two-part housing, which comprises a cover and a container, which may be either detachably connected or permanently bonded to one another. Detachable connections of the two housing parts may be produced, for example, through screwing or snapping. If screwing is used, a thread may be molded onto the housing parts or self-tapping screws may be used, which are inserted through one housing part and screwed into the other part. Of course, the screws may also be fixed using nuts. Permanent bonds of the housing parts may be produced, for example, through gluing, welding, or soldering.

In this embodiment, the cover and the container may be made of, e.g., metal or plastic; whereby the two parts can be made of the same or of different materials. That is to say, it is conceivable within the scope of the invention to have a container made of metal and a cover made of plastic or a container made of plastic and a cover made of metal.

According to a further embodiment of the present invention, the temperature detection unit is mechanically connected to the valve. In this case, the temperature detection unit is designed in such a way that the liquid temperature triggers a direct action, in particular a change in volume in a temperature-sensitive material, in the temperature detection unit. The temperature detection unit may, for example, be formed by an expansion/contraction element. As soon as the temperature detection unit comes into contact with a cold liquid, the temperature-sensitive material contracts, and the valve, which is mechanically coupled to the temperature detection unit, opens the connection line through which the returned liquid is supplied to the filter element. A part of the returned liquid may, however, be conducted into the liquid storage vessel, whereby defined pressure ratios can be produced and/or maintained in the liquid circuit.

It is advantageous to position a ventilation device in the liquid filter system, through which gases may be separated. This ventilation device may be designed, for example, as a leakage line or as a pressure-dependent valve. If the ventilation device is constructed as a valve, it may open automatically above a predetermined pressure and allow the gas to escape. The ventilation device is preferably positioned before the filter element, since gases accumulate at this point.

In another embodiment of the ventilation device, the valve of the controller is constructed as a piston, with the dimensions and tolerances of the piston being designed in such a way that a defined piston play exists, via which the ventilation of the liquid filter system may occur.

A further variant of the present invention includes a device in the liquid filter system for removing a separated second liquid, in particular a water drain screw. The separated second liquid may be, for example, water, which is separated, for example, from a lubricating oil or a fuel oil.

It is advantageous to integrate a liquid heater into the liquid filter system, through which the liquid in the liquid circuit may be heated. This liquid heater may be positioned at any desired points. It is particularly advantageous to position a heater before the filter element in the flow direction. In this case, one may select between two embodiments. The first embodiment exclusively heats the liquid which is pumped out of the liquid storage vessel, and the heated liquid from the liquid storage vessel subsequently is mixed with the returned liquid from the filter element. In the second embodiment, the cold liquid from the liquid storage vessel is first mixed with the returned liquid, and the resulting liquid mixture is subsequently heated by the liquid heater. In this embodiment as well, the liquid is heated before the filter element.

A further embodiment of the present invention includes a non-return valve or check valve, positioned downstream from the controller, which may be formed, for example, by a shield valve. This check valve prevents uncontrolled emptying of the liquid filter system and is preferably positioned between the controller and the liquid drain line. In other check valve configurations, the valve may be integrated in the liquid drain line, as a result of which the liquid is not able to drain into the liquid storage vessel.

In accordance with a further embodiment of the present invention, a pressure relief or overpressure valve, which is preferably positioned downstream from the controller, is integrated into the liquid filter system. The overpressure valve is designed in such a way that in the event of excessive liquid pressure in the liquid circuit, at least a part of the liquid may drain into the liquid storage vessel, so that damage to the components located in the liquid circuit may be prevented. This overpressure valve may be positioned between the controller and the liquid drain line. In an alternative embodiment, the overpressure valve may be integrated into the liquid outlet. Furthermore, the overpressure valve and the check valve may be combined into a single component, so that assembly is made easier and installation space is saved.

It is advantageous for the cover to be attached to the container in a liquid-tight manner using screws. In this case, these housing parts may be made of different materials. To facilitate liquid-tight attachment, a seal may be provided between the cover and the container. Such a seal may be fixed to either of the two housing parts or may be inserted loosely and clamped between them.

According to a further embodiment of the present invention, the liquid filter system is installed in a fuel injection system of a diesel-operated internal combustion engine. In this case, the liquid will be diesel fuel, which is pumped by a fuel pump out of a fuel tank and through a fuel filter to injection nozzles. The fuel pump delivers more fuel than is necessary for the operation of the internal combustion engine. The excess pumped fuel is conducted to the controller, from which, depending on the temperature, it is supplied to either the fuel filter or the fuel tank.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWING

The invention will be described in further detail hereinafter with reference to illustrative preferred embodiments shown in the accompanying drawings, in which.

DETAILED DESCRIPTION OF PREFERRED EMBODIMENTS

Figure 1:
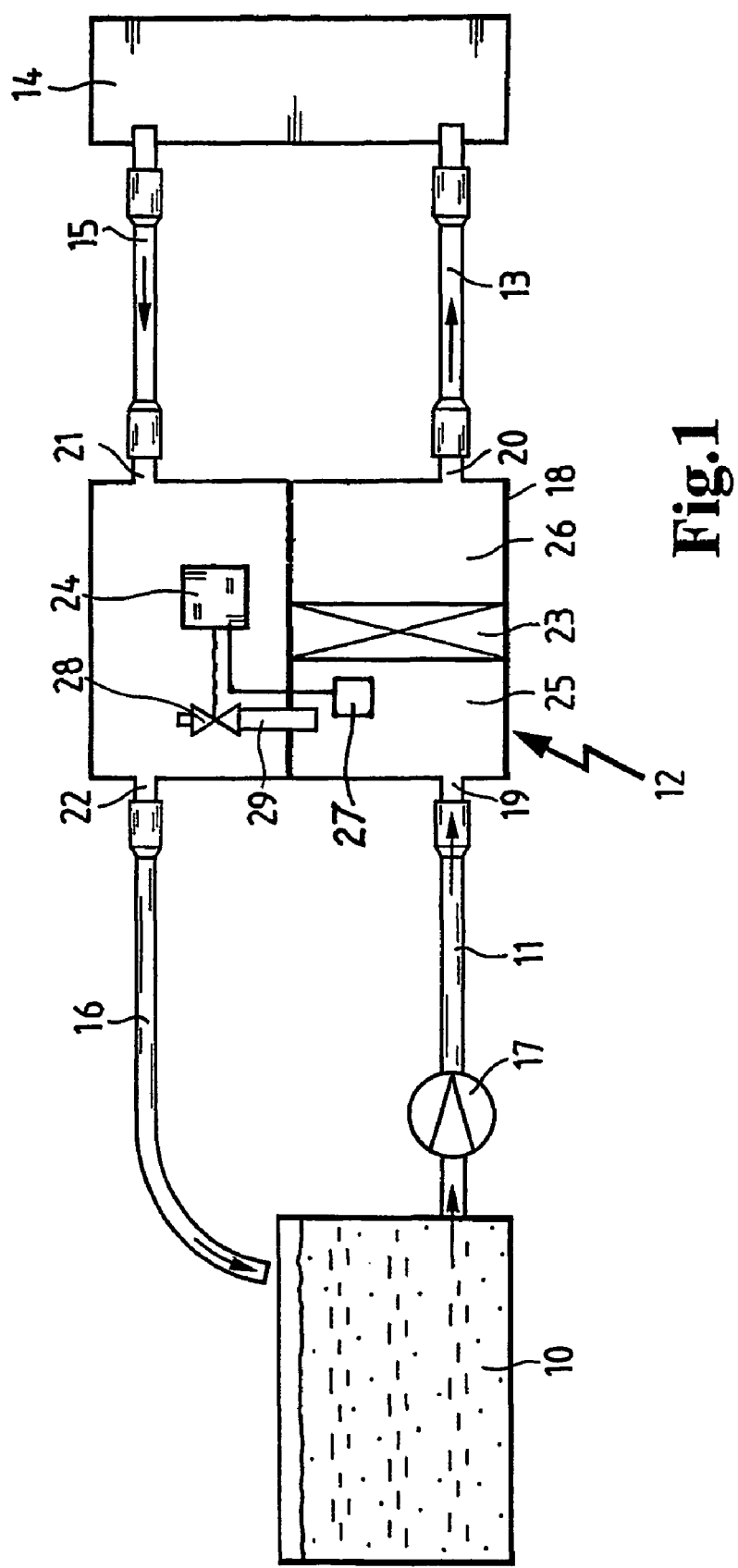
FIG. 1 shows a liquid circuit according to the invention.

A liquid circuit is schematically illustrated in FIG. 1. The liquid circuit is formed by a liquid storage vessel 10, an unfiltered liquid line 11, extending from the liquid storage vessel 10, a liquid filter system 12 attached to the unfiltered liquid line 11, a filtered liquid line 13 which connects a device 14 which consumes or uses the liquid to the liquid filter system 12, a liquid return line 15, and a liquid drain line 16. In order that a liquid may circulate in the liquid circuit, a liquid pump 17 is provided, which generates a liquid pressure in the liquid circuit and has a larger delivery volume than the maximum consumption of the user device 14.

In this illustrative embodiment, the liquid pump 17 is positioned in the unfiltered liquid line. However, the positioning of the liquid pump 17 within the liquid circuit is arbitrary. Consequently, if desired, pump 17 could be positioned, for example, in the liquid storage vessel, in the liquid filter system, or in other liquid-conducting lines.

The liquid filter system 12 comprises a housing 18, which has an unfiltered liquid inlet 19, a filtered liquid outlet 20, a liquid return 21, and a liquid outlet 22, all fixed on the housing. A filter element 23 and a controller 24 are integrated into the housing 18. The filter element 23 has an unfiltered liquid side 25 and a filtered liquid side 26, with the two sides being separated from one another by a seal around the filter element 23. The unfiltered liquid inlet 19 communicates with the unfiltered side 25 of the filter element 23 and is connected to the liquid storage vessel 10 by the unfiltered liquid line 11. The filtered liquid outlet 20 communicates with the filtered side 26 of the filter element 23, the filtered liquid line 13 being connected at one end to the filtered liquid outlet 20 and at the other end to the user device 14, both connections being sealed. In this way, filtered liquid from the liquid storage vessel 10 is supplied to the user device 14.

The excess liquid delivered by the liquid pump 17 is conducted back to the liquid filter system 12 via a liquid return line 15, which is connected to the liquid return 21, and is directed further by the controller 24 as a function of a liquid temperature existing in the liquid. In this embodiment, the controller 24 is provided with a temperature detection unit 27 for detecting the liquid temperature which senses the liquid temperature on the filtered side 26 of the filter element 23. The detection of the liquid temperature may, however, be performed at any desired points in the liquid circuit, such as in the liquid storage vessel 10, in other liquid lines 11 or 13, or on the unfiltered side 25 of the filter element 23.

Furthermore, the controller 24 includes an associated valve 28, which opens or closes a connection line 29, which communicates on one side with the liquid return 21 and on the other side with the unfiltered side 25 of the filter element 23, depending on the liquid temperature. At low liquid temperatures, particularly below 20° C., the valve 28 is opened, so that the excess liquid delivered by the liquid pump 17 is at least partially supplied via the connection line 29 to the unfiltered side 25 of the filter element 23. The excess liquid delivered by the liquid pump 17 has a somewhat higher temperature than the liquid in the liquid storage vessel. The increase in temperature is caused by the liquid pump 17 as it generates the liquid pressure. Furthermore, an increase in temperature may also be caused by a heat source, such as the liquid consumer or user device or other components positioned around the liquid circuit. The liquid delivered from the liquid storage vessel 10 mixes with the warmed recycle liquid supplied through the connection line 29 before they flow through the filter element 23.

As soon as the liquid temperature lies above the predetermined temperature, the excess pumped liquid is conducted back to the liquid storage vessel 10. If desired, a liquid cooler may be arranged on the liquid drain line 16, so that the liquid in the liquid storage vessel 10 is not heated above a critical liquid temperature.

In order to prevent the filtered liquid line 13 from running empty and a consequent insufficient supply of liquid to the user device 14, a check valve 8 may be positioned in the filtered liquid line 13. Furthermore, in another embodiment, an overpressure valve 9 may be provided, which connects the filtered liquid line 13 to the connection line 29 or the liquid drain line 16. The overpressure valve 9 serves to relieve excess liquid pressure, so that the user device 14 will not be damaged by excessive pressures.

Figure 2:
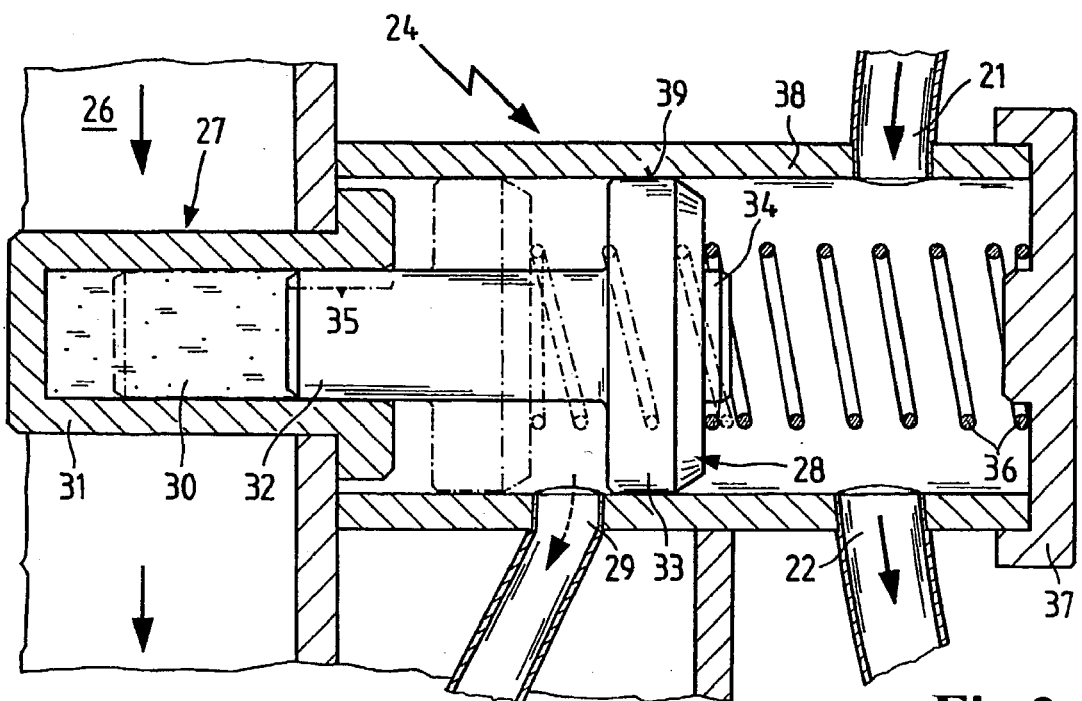
FIG. 2 is a sectional view of a controller in the installed state.

FIG. 2 is a sectional view of a controller 24 in the installed state. In this illustrative embodiment, the temperature detection unit 27 is mechanically connected to the valve 28. The temperature detection unit 27 is formed by a sleeve 31, partially filled with a temperature-sensitive material 30, the sleeve 31 being made of a material which has good thermal conductivity. The sleeve 31 is in contact with the liquid in filtered side 26 so that the liquid temperature is relayed to the temperature-sensitive material 30. If the liquid temperature is cold, the temperature-sensitive material 30 contracts. At a high liquid temperature, the temperature-sensitive material 30 expands.

The valve 28 is formed by a piston rod 32, a piston 33, and a spring guide 34. The piston rod 32 preferably has a cylindrical configuration; however, piston rods 32 constructed in other shapes, such as parallelepiped, are also conceivable. The piston rod 32 is inserted into the sleeve 31, which is filled with the temperature-sensitive material 30, care being taken that the piston rod 32 is smooth-running, but that the temperature-sensitive material 30 may not escape between the piston rod 32 and the sleeve 31 as it expands.

Upon expansion of the temperature-sensitive material 30, the piston rod 32 must be at least partially pushed out of the space 31. It is advantageous if a part of the piston rod 32 remains in the sleeve, due to which the piston rod 32 is provided with a guide region 35, which prevents canting of the piston rod 32 during its movements within the sleeve 31.

Upon contraction of the temperature-sensitive material 30, the piston rod 32 is urged into the sleeve 31 by a spring 36, which is clamped between the piston 33 and an end cap 37. The spring 36 is arranged under a slight pre-stress or bias in a valve chamber 38, which, together with the end cap 37, forms the outer contour of the controller 24, so that the temperature-sensitive material 30 may still displace the piston rod 32. The end cap 37 may be detachably connected or permanently bonded to the valve chamber 38.

The piston 33 has a cylindrical configuration and includes a lateral surface 39 which is guided in the valve chamber 38. The piston 33 has a tight tolerance with the valve chamber 38 such that no and/or only a slight leakage flow may escape.

In this illustrative embodiment, the liquid flows through the controller 24. The liquid reaches the controller 24 from the liquid return 21. If the liquid temperature lies above a defined temperature, the temperature-sensitive material 30 is expanded and the piston rod 32 projects far out of the sleeve 31, so that the piston 33 is located in a first end position shown in solid lines in which the connection line 29 is blocked off and the liquid is conducted into the liquid outlet 22.

At a liquid temperature below a defined temperature, the temperature-sensitive material 30 contracts and the piston rod 32 projects only slightly out of the sleeve 31. In this operating position (shown in broken lines), the piston 33 is in a second end position, in which it opens the connection line 29 so that the liquid may flow through the connection line 29, as well as through the liquid outlet 22.

If desired, flow regulating valves (not shown) may be provided on the liquid outlet 22 and/or on the connection line 29, which control the flow rate of the liquid depending on where more liquid is to flow. The liquid return 21 and the liquid outlet 22 may be positioned in such a way that they lie opposite one another or are positioned at an angle to one another. The liquid return 21 may, however, also be positioned in a plane offset relative to the liquid outlet 22. The connection line 29 is positioned such that the piston 33 blocks off the connection line at higher liquid temperatures and opens it at lower liquid temperatures.

Figure 3:
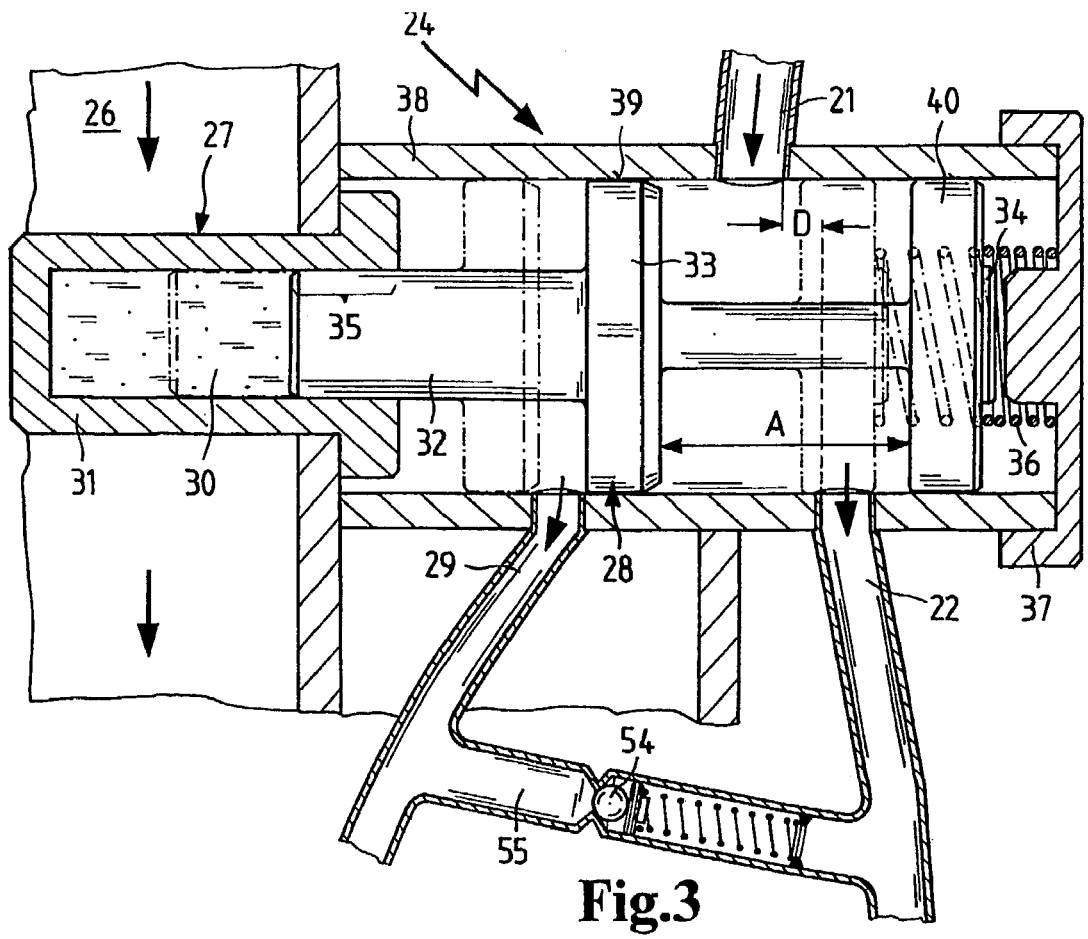
FIG. 3 is a sectional view showing a modified controller.

FIG. 3 is a sectional view of a controller 24. This controller 24 essentially corresponds to FIG. 2, except that the valve 28 and the positions of the liquid return 21 and of the liquid outlet 22 are modified. The position of liquid return 21 in relation to the liquid outlet 22 is selected in such a way that a distance D lies between them. In this embodiment, the valve 28 comprises a stopper piston 40, which is positioned at a distance A from the piston 33. The distance A and the distance D are tailored to one another in such a way that the valve 28 opens the liquid return 21 and the liquid outlet 22 in a first end position and closes the connection line 29 using the piston 33, or opens the liquid return 21 and the connection line 29, but closes the liquid outlet 22 using the stopper piston 40, in a second end position (shown in broken lines).

In order to assure that an excessive liquid pressure, which is so high, for example, that it might damage the filter element, does not act on the filter element 23 in the second end position (shown in broken lines), a pressure relief or overpressure valve 54 may be provided. The overpressure valve 54 is positioned in an overpressure line 55, which connects the connection line 29 to the liquid outlet 22. As soon as the liquid pressure in the connection line 29 exceeds a defined liquid pressure, in particular 1 bar, the overpressure valve 54 opens the overpressure line 55, through which the liquid may drain into the liquid outlet 22. Once the liquid pressure in line 29 falls below the defined liquid pressure, the overpressure valve 54 closes again and the liquid is only conducted through the connection line 29.

Figure 4:
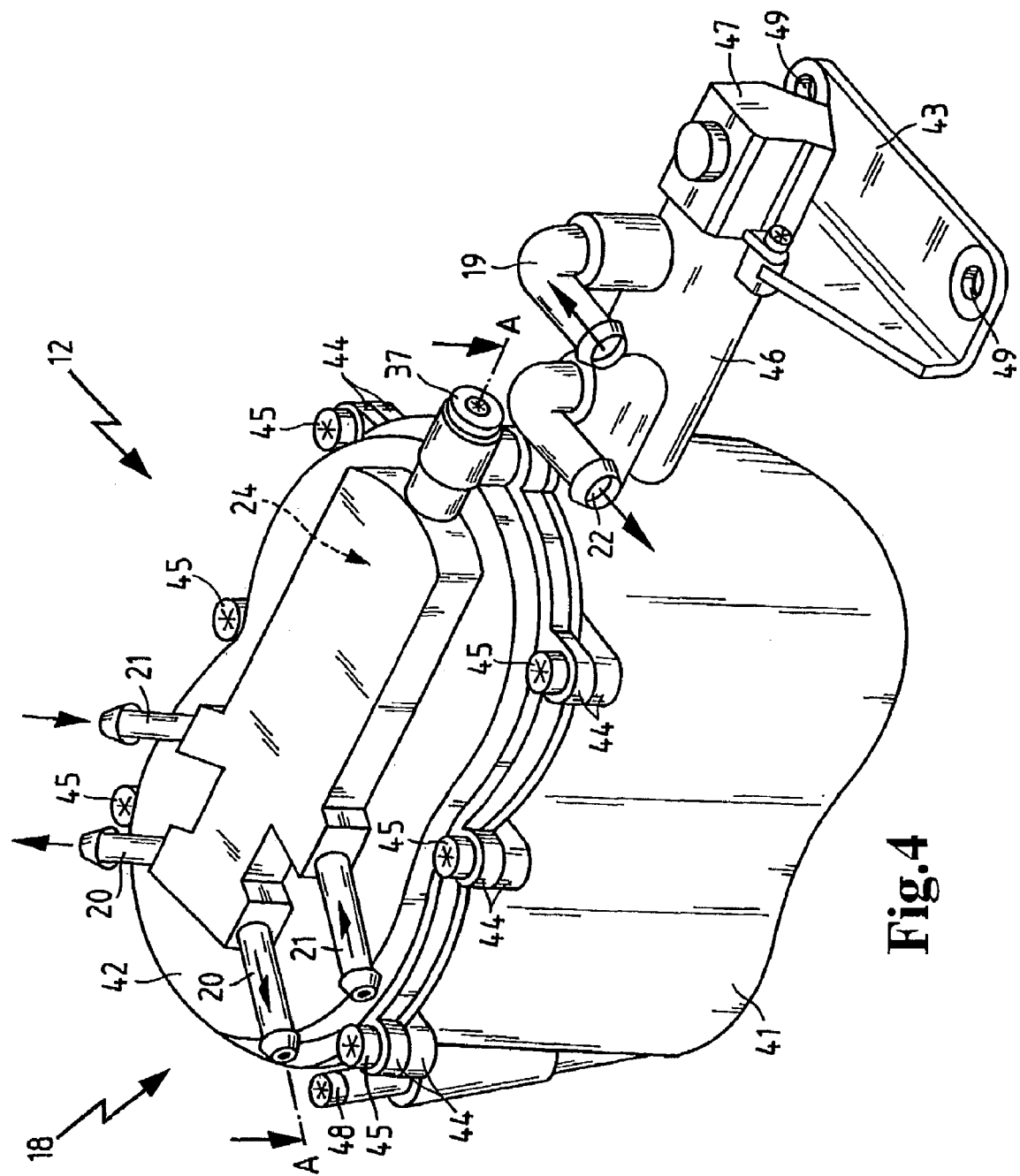
FIG. 4 is a perspective view of a liquid filter system.

FIG. 4 is a perspective view of a liquid filter system 12, which is particularly adapted for use in a fuel injection system of a V-engine. The liquid filter system 12 is essentially formed by a housing 18 and a mounting bracket 43. The housing 18 comprises a container 41 and a cover 42, the cover 42 and the container 41 each having molded attachment regions 44, which are secured to one another using screws 45. In this illustrative embodiment, the unfiltered liquid inlet 19 and the liquid outlet 22 are positioned on the container 41, and are plugged into the container 41 as plug-in parts using a press fit and glued to form a seal. The unfiltered liquid inlet 19 opens into a liquid pipe 46, in which a liquid heater 47 is positioned, which may heat the entering liquid if it has a liquid temperature below a defined value. The liquid outlet 22 may be connected to the liquid storage vessel 10 using a liquid drain line 16 as shown in FIG. 1.

This illustrative embodiment has two filter liquid outlets 20 and two liquid returns 21, which are integrated into the cover 42 and are glued to the cover 42 as plug-in parts to form a seal. In this way, two user or consumer devices 14 (see FIG. 1) may be connected in parallel. In order to connect multiple consumer devices 14 to the liquid filter system 12, a corresponding number of filtered liquid outlets 20 and liquid returns 21 should be provided, and the liquid pump 17 (see FIG. 1) should be designed or selected so that it has a sufficient output capacity. Furthermore, the controller 24 (see FIGS. 1–3) comprises the valve 28 and the temperature detection unit 27 and is integrated into the cover 42 and secured therein by the end cap 37.

This liquid filter system 12 is provided with a water drain screw 48, through which water or another separated liquid, which has settled in the container 41, may be withdrawn from the liquid filter system 12. Preferably, a sensor, which senses the separated liquid and emits a signal which initiates manual or automatic discharge of the separated liquid, is positioned in the bottom region of the liquid filter system 12. This sensor may be constructed in such a way that it also detects a liquid pressure existing in the liquid filter system 12.

The bracket 43 is shown attached to the liquid pipe 46. However, the bracket 43 may also be attached at other points of the housing 18. The bracket 43 has two holes 49 through which attachment screws may be inserted and screwed together in order to mount the liquid filter system 12 to other elements provided for this purpose. If desired, damping components (not shown), such as rubber elements, may be included in the mounting structure. Furthermore, additional attachment points may be provided on the container 41, which may be inserted into corresponding receptacles, if desired, with interposition of suitable damping components.

Figure 5:
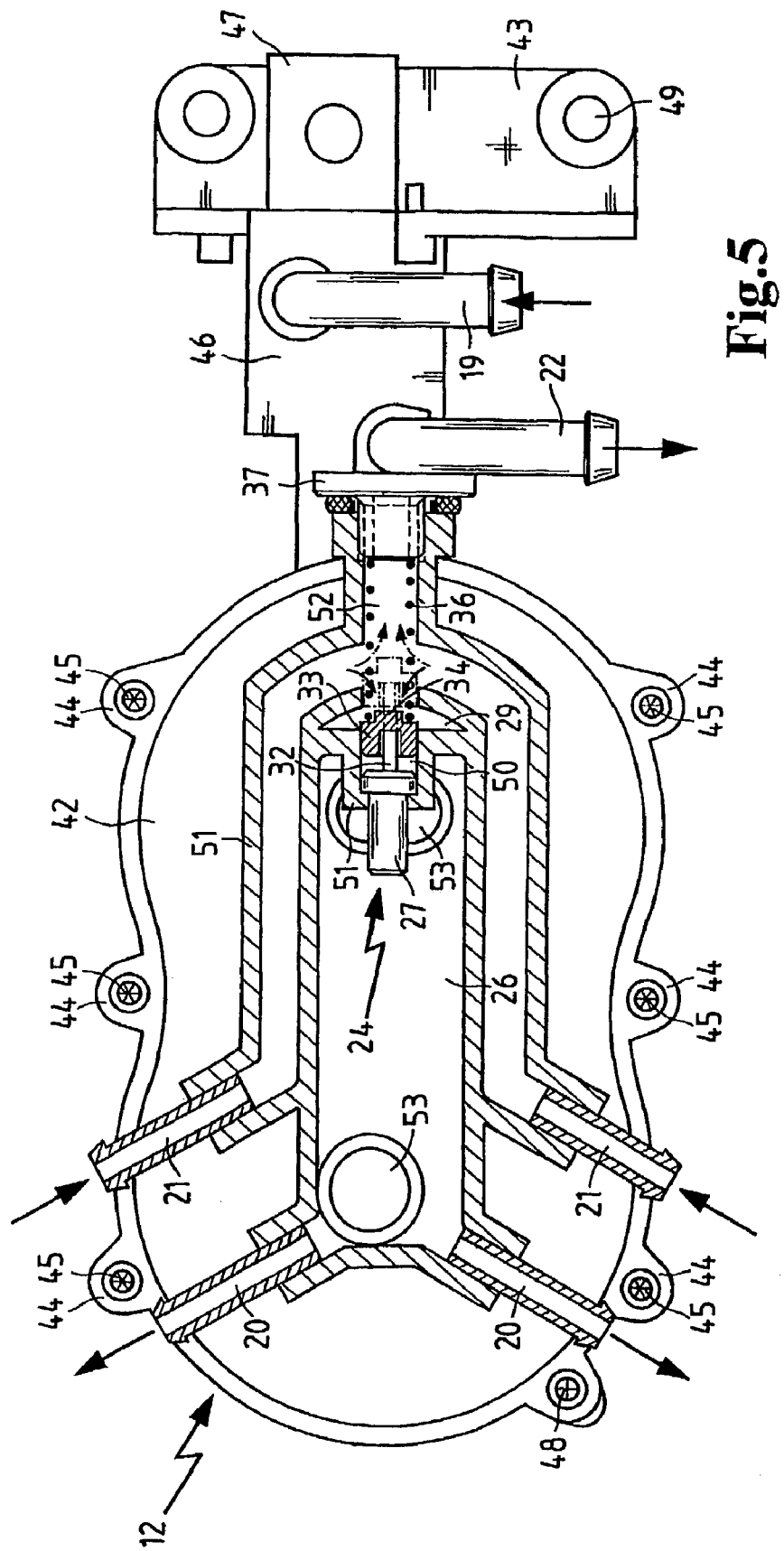
FIG. 5 is a sectional view of the liquid filter system of FIG. 4.

FIG. 5 is a sectional view of the liquid filter system 12 of FIG. 4 taken along section line A—A. This section A—A runs centrally through the filtered liquid outlets 20, the liquid returns 21, and the controller 24, as a result of which the top of cover 42 is missing from the drawing figure. The controller 24 is integrated into the cover 42, which is constructed in such a way that it has walls 51 which conduct the liquid in desired paths. The temperature detection unit 27 is in contact with the liquid on the filtered liquid side 26 of the filter. The piston 33 is arranged in a recess or chamber 50 which is formed by walls 51 of the cover, and is depicted in its end position in the cold state, so that the connection line 29 is open. Therefore, the unused liquid, which is returned through the liquid return 21, may reach the connection line 29 and thus pass to the unfiltered liquid side 25 of the filter element 23 (see FIG. 1). A further part of the liquid is supplied to the liquid outlet 22 via an outlet connection line 52, since this outlet is not closed off.

In this illustrative embodiment, the filter element 23 is formed by two cylindrical filter cartridges, which are positioned below two outlets 53 in the container 41 (see FIG. 4).

If the liquid temperature rises above a defined temperature, the piston 33 is moved to its end position in the warm state (shown in broken lines). In this position, the piston 33 blocks off the connection line 29, so that the returned liquid is supplied through outlet connection line 52 to the liquid outlet 22.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A liquid circuit comprising
   a liquid storage vessel,
   a liquid pump,
   a consumer device,
   a filter element disposed in a filter housing, said filter element dividing the liquid circuit into an unfiltered liquid side and a filtered liquid side, and
   a controller with a temperature detection unit for determining the temperature of a liquid in the liquid circuit, wherein said temperature detection unit is arranged on the unfiltered side of the filter element between the liquid storage vessel and the filter element and detects the temperature of the unfiltered fluid on the unfiltered side of the liquid circuit;
   wherein said filter element and said controller are integrated into a common liquid filter system comprising a housing having an unfiltered liquid inlet communicating with the unfiltered liquid side of the filter element, a filtered liquid outlet communicating with the filtered liquid side of the filter element, a liquid return which communicates with the controller, and a liquid outlet which communicates with the controller which directs liquid flow to the liquid outlet under all temperature conditions;
   said liquid storage vessel being connected to the unfiltered liquid inlet by an unfiltered liquid line; said filtered liquid outlet being connected to the consumer device by a filtered liquid line; said consumer device being connected to the liquid return by a liquid return line, and said liquid outlet being connected to the storage vessel by a liquid drain line; and
   wherein said controller comprises a valve for returning a portion of the excess liquid not needed by the consumer device to the unfiltered side of the filter element via a connection line under low temperature conditions.

2. A liquid circuit according to claim 1, wherein said liquid return line is a fuel return line of a fuel injection system.

3. A liquid circuit according to claim 1, wherein said housing is constructed of a first, container part and a second, cover part, and said controller is positioned in the cover part, and said filter element is positioned in the container part.

4. A liquid circuit according to claim 3, wherein the cover part is attached to the container part in a liquid-tight manner with screws.

5. A liquid circuit according to claim 1, wherein the temperature detection unit is mechanically connected to the valve.

6. A liquid circuit according to claim 1, further comprising a ventilation device positioned in the liquid filter system.

7. A liquid circuit according to claim 1, wherein said liquid circuit is a fuel line for diesel fuel, further comprising a water discharge screw for withdrawing water separated from the diesel fuel in said filter system.

8. A liquid circuit according to claim 1, further comprising a liquid heater integrated into the liquid filter system.

9. A liquid circuit according to claim 1, further comprising a check valve arranged downstream from the controller.

10. A liquid circuit according to claim 1, further comprising an overpressure valve arranged downstream from the controller for releasing excess liquid pressure from the filter system.

11. A liquid circuit comprising
    a liquid storage vessel,
    a liquid pump,
    a consumer device,
    a filter element which divides the liquid circuit into an unfiltered liquid side and a filtered liquid side, and
    a controller with a temperature detection unit located for determining the temperature of an unfiltered liquid on the unfiltered liquid side of the filter element;
    wherein said filter element and said controller are integrated into a common liquid filter system comprising a housing having
    an unfiltered liquid inlet communicating with the unfiltered liquid side of the filter element,
    a filtered liquid outlet communicating with the filtered liquid side of the filter element between the liquid storage vessel and the consumer device,
    a liquid return which communicates with the controller, and
    a liquid outlet which communicates with the controller which directs liquid flow to the liquid outlet;
    said liquid storage vessel being connected to the unfiltered liquid inlet by an unfiltered liquid line; said filtered liquid outlet being connected to the consumer device by a filtered liquid line; said consumer device being connected to the liquid return by a liquid return line, and said liquid outlet being connected to the storage vessel by a liquid drain line;
    wherein said controller comprises a valve for returning a portion of the excess liquid not used by the consumer device to the unfiltered side of the filter element via a connection line under low temperature conditions.

12. The liquid circuit of claim 11, wherein the valve is mechanically connected to the temperature detection unit; the temperature detection unit comprises a sleeve filled with a temperature-sensitive material, and the valve comprises a piston, a piston rod with one end attached to the piston, and a spring guide in contact with another end of the piston rod, and wherein the piston can be inserted into the sleeve so that the temperature-sensitive material will remain between the piston and the sleeve.

13. The liquid circuit of claim 12, wherein the valve comprises a piston, a piston rod with one end attached to the piston, a stopper piston in contact with another end of the piston rod, a stopper piston rod with one end attached to the stopper piston, and a spring guide in contact with another end of the stopper piston rod, and wherein the piston can be inserted into the sleeve so that the temperature-sensitive material will remain between the piston and the sleeve.

14. The liquid circuit of claim 12, wherein the connection line is blocked from returning the portion of the excess fluid not used by the consumer device to the unfiltered side of the filter element when a temperature of the unfiltered liquid is equal to or above a predetermined temperature, whereupon the temperature-sensitive material expands to push the piston outside the sleeve and the stopper piston is pushed to unblock the liquid outlet.

15. The liquid circuit of claim 14, wherein the connection line is unblocked from returning the portion of the excess fluid not used by the consumer device to the unfiltered side of the filter element when a temperature of the unfiltered liquid is below a predetermined temperature, whereupon the temperature-sensitive material contracts to keep the piston in the sleeve and the stopper piston is moved to block the liquid outlet but not the liquid return.

16. The liquid circuit of claim 12, further comprising an overpressure relief valve disposed in an overpressure line which connects the connection line and the liquid outlet.

17. The liquid circuit of claim 16, wherein the overpressure valve opens the overpressure line to drain the liquid from the connection line to the liquid outlet when a liquid pressure of the connection line is equal or above a predetermined liquid pressure, and closes the overpressure line to stop the flow of the liquid from the connection line to the liquid outlet when a liquid pressure of the connection line is below said predetermined liquid pressure.

* * * * *